F. WRIGHT.
DRAFT MEANS FOR VEHICLES.
APPLICATION FILED APR. 15, 1919. RENEWED JULY 16, 1920.
1,365,013.
Patented Jan. 11, 1921.
FIG. 1
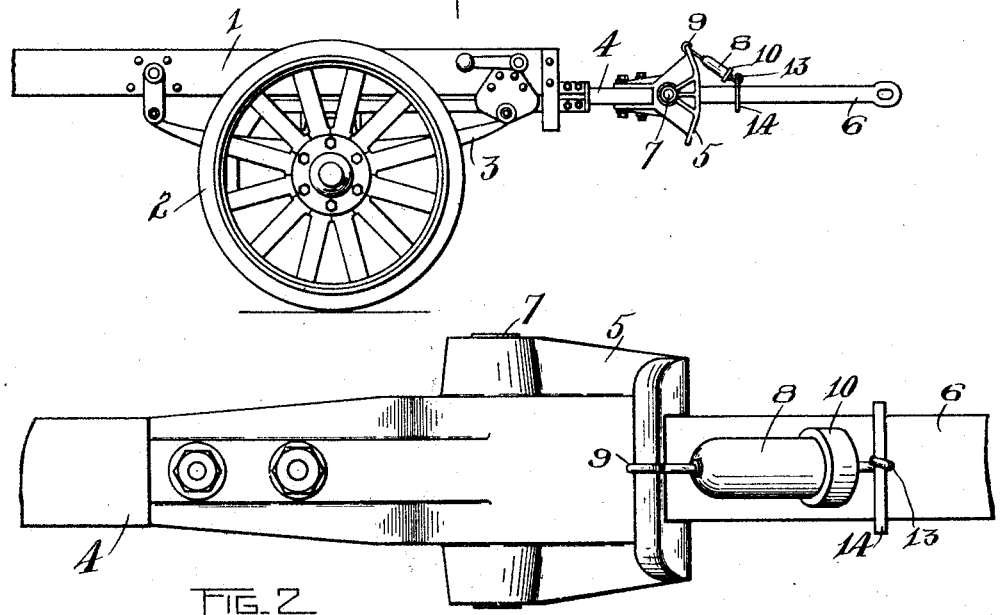
FIG. 2
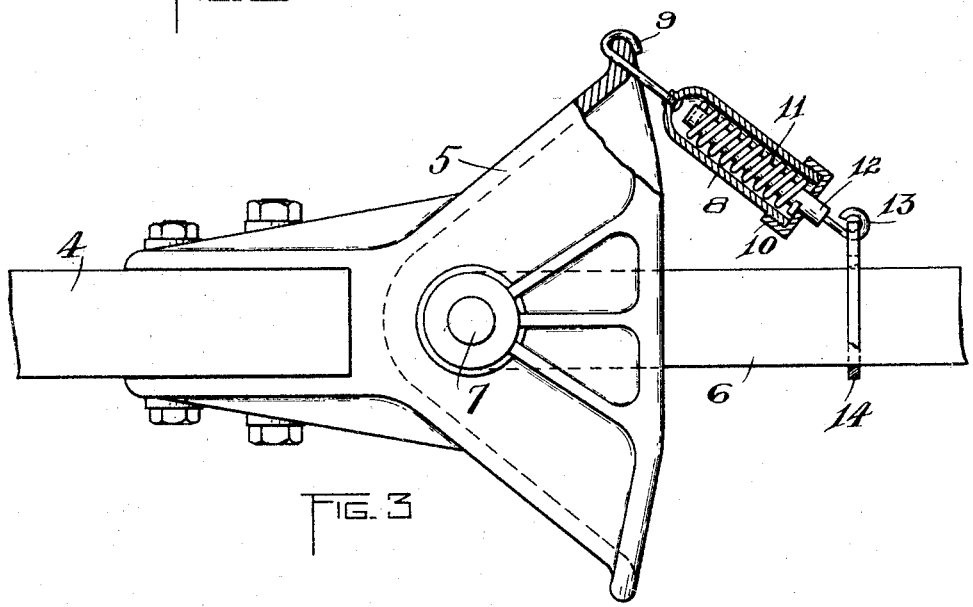
FIG. 3
INVENTOR.
Frank Wright
BY
ATTORNEYS.

UNITED STATES PATENT OFFICE.

FRANK WRIGHT, OF NEWARK, NEW YORK, ASSIGNOR TO ARCADIA TRAILER CORPORATION, OF NEWARK, NEW YORK, A CORPORATION.

DRAFT MEANS FOR VEHICLES.

1,365,013.      Specification of Letters Patent.      Patented Jan. 11, 1921.

Application filed April 15, 1919, Serial No. 290,251. Renewed July 16, 1920. Serial No. 396,878.

*To all whom it may concern:*

Be it known that I, FRANK WRIGHT, a citizen of the United States, and resident of Newark, in the county of Wayne and State of New York, have invented certain new and useful Improvements in Draft Means for Vehicles, of which the following is a specification.

The present invention relates to draft means for vehicles and particularly to the type in which a draft head on one vehicle is provided with a link or connecting member for connection with a draft device on another vehicle, an object of this invention being to provide a positioning means for holding the link or connecting member in different positions on its draft head in order that it may be directed into connection with the draft device on another vehicle, notwithstanding the fact that the vehicles are arranged at different heights, this being particularly desirable where a motor vehicle is to connect with a trailer and is in a higher or lower plane than the trailer.

To this and other ends, the invention consists of certain parts and combinations of parts, all of which will be hereinafter described, the novel features being pointed out in the appended claims.

In the drawings:

Figure 1 is a side view of a portion of a trailer equipped with the present invention;

Fig. 2 is a plan view of the draft head with a portion of the connecting link;

Fig. 3 is an enlarged side view of the draft head and a portion of the connecting link, the yielding device of the positioning means being shown in section as well as a portion of the draft head.

Referring more particularly to the drawings, 1 indicates the main frame of the trailer supported on the wheels 2 through the springs 3. On the main frame, a draft bar 4 is secured in any suitable manner and this draft bar has at its outer end a draft head 5 of substantially bell shape in which a link or connecting member 6 is pivotally mounted at 7, the link or connecting member being adapted to swing on the pivot in a vertical plane but being confined against lateral movement relatively to the head through the side walls of the head.

Considerable difficulty has heretofore been met when it has been desired to connect a motor truck with a trailer on hilly or un-level ground, this being due to the fact that it has been hard to maintain the connecting link in position where it will be engaged by the draft device on the motor truck because the sustaining of the draft link in proper position was done by hand and this involved danger to the holder of the link. According to this invention the link may be positioned so that its outer end will properly coöperate with the draft appliance on the motor vehicle.

This positioning means in this embodiment comprises a yielding device in the form of a casing 8 pivotally connected at 9 to the top of the draft head 5 above the link 6, said casing having a cap 10 at its other end forming a seat for a helical spring 11 which is inclosed in the casing. Operating through the cap is a plunger 12 which has connection with the inner end of the spring at one end and is pivotally connected at 13 at its outer or other end to a device which adjustably connects with the link 6. In this instance, this device is in the form of a clutch loop 14 which may be moved along the link 6 and when the proper position of the said link is obtained the spring 11 will act on the clutch loop to form a binding engagement with the link 6, thus yieldingly securing the link in the desired position.

From the foregoing it will be seen that there has been provided an adjustable positioning means for holding a draft link in different positions on a draft head so that such draft link may be properly directed to a draft device on another vehicle, notwithstanding the fact that the two vehicles lie in different planes on hilly or uneven ground.

What I claim as my invention and desire to secure by Letters Patent is:

1. The combination with a draft head and a draft link pivotally connected thereto to swing about a horizontal axis; of adjustable positioning means for holding said link in different positions on the head, said means having a yielding device which will permit the yielding of the link on the head.

2. The combination with a draft head and a draft link pivotally connected thereto to swing about a horizontal axis; of adjustable positioning means for holding said link in different positions on the head, said means comprising a clutch loop adjustable on the link and connected with the head.

3. The combination with a draft head and a draft link pivotally connected thereto to swing about a horizontal axis; of adjustable positioning means for holding said link in different positions on the head, said means comprising a clutch loop adjustable on the link, and a spring device connecting the loop to the head.

FRANK WRIGHT.